United States Patent [19]

Hollis, Jr. et al.

[11] Patent Number: 4,514,674
[45] Date of Patent: Apr. 30, 1985

[54] ELECTROMAGNETIC X-Y-THETA PRECISION POSITIONER

[75] Inventors: Ralph L. Hollis, Jr., Yorktown Heights; Bela L. Musits, Hopewell Junction, both of N.Y.

[73] Assignee: International Business Machines Corporation, Armonk, N.Y.

[21] Appl. No.: 564,630

[22] Filed: Dec. 22, 1983

[51] Int. Cl.³ ............................................. G05B 19/40
[52] U.S. Cl. ..................... 318/687; 318/571; 318/640; 318/135
[58] Field of Search ............... 318/687, 571, 135, 640, 318/685, 696, 38; 356/358

[56] References Cited

U.S. PATENT DOCUMENTS

| Re. 27,289 | 2/1972 | Sawyer | 318/38 |
| 3,457,482 | 7/1969 | Sawyer | 318/38 |
| 3,735,231 | 5/1973 | Sawyer | 318/687 |
| 3,867,676 | 2/1975 | Chai et al. | 318/135 |
| 3,935,486 | 1/1976 | Nagashima | 310/12 |
| 4,286,197 | 8/1981 | Eberhard et al. | 318/38 |
| 4,319,189 | 3/1982 | Cullum, Jr. et al. | 324/208 |
| 4,455,512 | 6/1984 | Cornwell et al. | 318/135 |

OTHER PUBLICATIONS

Application Note 197-2, Laser and Optics, 5501 A Laser Transducer, Hewlett-Packard Corp., 1501 Page Mill Rd., Palo Alto, Calif., hereinafter referred to as Hewlett-Packard, (1980).

*Primary Examiner*—Vit W. Miska
*Assistant Examiner*—Saul M. Bergmann
*Attorney, Agent, or Firm*—Carl C. Kling

[57] ABSTRACT

Mounting a position sensor equipped planar armature, in operative juxtaposition to a stator, by a spring colonnade basket of flexure columns, provides a low-friction precision X-Y-Theta positioner which has computer control of operations with feedback of actual position for closed loop servo operation.

The spring colonnade basket provides freedom of motion in the X, Y and Theta (rotation about an axis mutually perpendicular to X and Y) dimensions without static friction present in sliding or rolling motions. The armature, which carries a gripper or other end effector and is free to move only within its own plane, is positioned by a motor made up of the armature and a stator mounted on a support platform. The stator is made up of a pair of U-shaped permanent magnets, each having U-shaped pole pieces mounted orthogonally to each other, at 45 degree angles to the axis of the magnet, so that each electromagnet controls motive power in both X and Y dimensions. Imbalances in the vector sums of the motive power of the electromagnets produces torque which provides Theta motion.

Position sensors are mounted on the armature and stator. Position sensing signals are fed back to a computer for use in operations including repositioning The computer can vary the compliance of the flexure columns by adjusting the motor control currents as a function of a compliance variable.

5 Claims, 10 Drawing Figures ically powered X-Y-Theta
ELECTROMAGNETIC X-Y-THETA PRECISION POSITIONER

BACKGROUND OF THE INVENTION

1. Field of the Invention

This invention relates to electromagnetic precision positioners operable to provide precision positioning capability to a robot end effector, and more particularly relates to an electromagnetically powered X-Y-Theta positioner device, comprising an armature platform supported for X-Y-Theta motion by a spring colonnade basket in juxtaposition to its stator, which positions operates without static friction, with controlled power and compliance with precise control of position, and with positional feedback for closed loop servo operation.

2. Description of Related Art

The need for precision positioning is well known in a number of mechanical and electronic arts. Close tolerance machining, for example, requires that the tool be positioned exactly. Various mechanisms for accomplishing such positioning, and various techniques for getting the most out of such mechanisms, are known.

A known mechanism for accomplishing precision positioning within a plane is the use of a linear motor to drive and hold a device in a particular position. Such linear motors, as well as electromechanical stepping motors, hydraulic actuators, and other mechanisms are known for use in precision positioning.

A typical solution to the need for high precision motion, in a plane of scanning for a robot end effector, is to provide a pair of linear actuators mechanically connected in tandem so that the Y-actuator is physically carried at the end of the X-actuator. A disadvantage of this approach is that the Y and X stages are mechanically in series, the Y stage moves the payload, but the X stage must move both the Y stage and the payload. Symmetry is broken, and in critical applications the control strategies for the X stage and the Y stage must be different for the different dynamics involved. Theta motion (rotation about an axis orthogonal to X and Y) may require still another tandem stage.

RELATED PRIOR ART PATENTS

U.S. Pat. No. 3,457,482, Sawyer, Magnetic Positioning Device, July 22, 1969, shows a head incorporating two parallel sets of magnets along each of two perpendicular axes, with driving circuitry for selectively energizing the magnet coils.

U.S. Pat. No. 3,735,231, Sawyer, Linear Magnetic Drive System, May 22, 1973, shows an orthogonal linear motor mechanism, for moving a head about a platen, with a servo loop for precision control of position.

U.S. Pat. No. 3,867,676, Chai et al, Variable Reluctance Linear Stepper Motor, Feb. 18, 1975, shows a variable reluctance linear stepping motor with a special set of windings in series aiding relationship.

U.S. Pat. No. 3,935,486, Nagashima, Finely Adjustable Table Assembly Jan. 27, 1976, shows an electromechanically adjustable table assembly in which the table is suspended by oval, flat springs and positioned electromagnetically.

U.S. Pat. No. 4,286,197, Eberhard et al, Two-Coordinate Positioning Device, Aug. 25, 1981, shows a two-coordinate tool positioning device having orthogonal linear motors.

U.S. Pat. No. 4,455,512, Cornwell et al, June 19, 1984, System for Linear Motor Control, shows a feedback system for table positioning.

U.S. Pat. No. Re 27,289, Sawyer, Magnetic Positioning Device, Feb. 15, 1972, shows a precision positioner having two U-shaped soft iron pole pieces, each wound with copper wire, biased with fields produced by a permanent magnet. In the absence of coil current, magnetic flux links the two pole pieces, symmetrically dividing between the left and right legs of each pole piece, forming a closed path through the air gaps and soft iron armature. Induced fields in the pole pieces add or subtract from the bias fields and provide positioning impetus to an armature. The Sawyer motor shows a two-dimensional linear positioner based on permanent magnet flux steering, using a pair of magnets arrayed asymmetrically or achieve within a single step limited two-dimensional linear motion over a restricted displacement.

Application Note 197-2, "Laser and Optics," 5501A Laser Transducer, Hewlett-Packard Corp., 1501 Page Mill Road, Palo Alto, Calif., 1980, pp. 32–33, 41–43, shows a technique for sensing table position optically.

Copending U.S. patent Ser. No. 563,334, filed Dec. 20, 1983, Hollis, Precision X-Y Positioner, shows a friction-free X-Y positioner similar in some respects to the X-Y positioning capability of the X-Y-Theta positioner of this patent application, of which Hollis is a co-inventor.

DISADVANTAGES OF THE PRIOR ART

In the prior art, fine positioners tend to require sliding motion planar mechanisms, or wheeled carriages, to allow the multidimensional motions required to position the end effector as desired. Such fine positioners tend to be heavy because of the multiple coils and associated magnet armatures. This heaviness causes the fine positioners to be slow in response, subject to wear problems, and in need of frequent lubrication, adjustment and repairs.

Even a cantilevered fully-suspended platform positioner such as described by Nagashima does not resolve all problems of excess mass, and susceptability to oscillation. Nagashima's response to the oscillation problem, damping in silicon oil, slows the response and makes it difficult to operate in attitudes other than horizontal.

In the prior art fine positioners of the linear motor type, the position of the armature may be estimated as a function of the current, but the actual position of the armature cannot accurately be determined under conditions of varying load and varying dynamics.

Particularly in the context of tool positioning for machining, the need persists for a strong, durable precision positioning device which does not suffer the wear and clearance problems associated with frictional sliding and wheeled carriages, and which provides actual position feedback.

SUMMARY OF THE INVENTION

In the electromagnetic precision positioner according to the invention, an armature is mounted for free movement in X, Y and Theta directions in a reference plane. The armature is supported in its own plane by a spring colonnade basket of flexure columns which permit limited free motion of the armature in X-Y-Theta directions. The armature is arranged to carry a gripper, chuck, cutting tool, or other end effector, and is free to move within the reference plane to the desired X-Y-Theta coordinates. A stator positioned close to the armature provides motive power by means of a pair of U-shaped magnets, each having coil-equipped U-shaped pole pieces mounted orthogonally to each other and at 45 degree angles to the axis of the magnet. The armature and stator together form the positioner motor. Electrical currents applied to the coils provides motive power to move the armature to the desired X-Y-Theta coordinates, still within the armature plane. There is an inconsequential Z-component which can be ignored or compensated. Electromotive force differentials applied to the armature oppose any forces tending to move the armature from the desired X-Y-Theta coordinates. Position and angle sensors provide feedback to a computer which calculates position and angle error statements to control motor control circuits driving the positioner motor. Compliance, the resistance to repositioning force, may be controlled by the computer by varying the response of the motor control circuits to instantaneous position and angle error statements.

An object of the invention is to provide X-Y-Theta precision positioning for the end effector of a robot, without encountering the problem of static friction which is inherent in sliding planar mechanisms and wheeled carriages or in oscillation damping mechanisms.

Another object is to provide a robust precision X-Y-Theta positioner which is easy to manufacture and to service.

Another feature of the invention is its provision of variable compliance capability in a precision X-Y-Theta positioner.

An advantage of the invention is that it permits X-Y-Theta positioning of a tool with precision in the submicron and fractional-degree ranges.

Another advantage of the invention is that it permits the quick and easy X-Y-Theta positioning of a tool without the loss of precision required to overcome static friction inherent in sliding or wheeled devices.

The foregoing and other objects, features and advantages of the invention will be apparent from the more particular description of the preferred embodiments of the invention, as illustrated in the accompanying drawings.

DESCRIPTION OF THE PREFERRED EMBODIMENT

Figure 1:
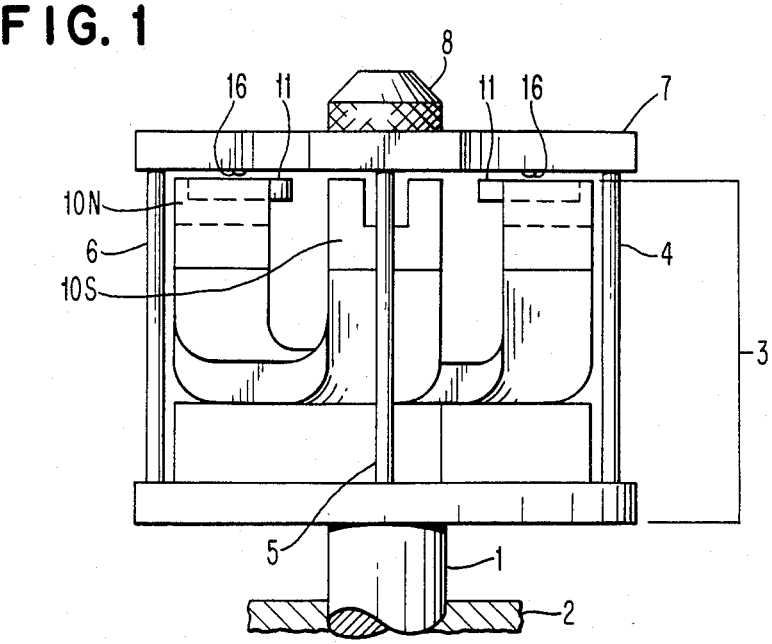
FIG. 1 is a side elevation diagram of the precision X-Y-Theta positioner, slightly simplified for ease of presentation.

FIG. 1 shows the precision X-Y-Theta positioner in abbreviated detail for ease of description. Support post 1 and bracket 2 may be mounted on a movable gross positioning device or may be solidly mounted to a table. Solidly mounted at the top of support post 1 is stator 3, which defines a reference plane from which motions may be defined. The precision X-Y-Theta positioner may be inverted from the attitude illustrated in FIG. 1, or used in other attitudes with gravity compensation.

Stator 3 includes electromagnets and may be considered as stator means. The stator means includes suitable electrical connections and mechanical support structure as is well known in the art. The stator means carries position sensors and rests inside a spring colonnade basket of flexure columns (4, 5 6 shown) which support armature 7 in its own plane parallel to the reference plane. Armature 7 may carry a chuck or other fixture 8, which fixture is suspended, protected against any significant Z-motion normal to the base plane, but allowed friction-free X-Y-Theta motion to positions determined by currents in coils (not shown) on magnet 9 pole pieces 10 of the stator means. The armature, of magnetically soft material, is configured for weight minimization and flux maximization, with several teeth arranged for flux coupling to the electromagnets in the stator means, as is known in the art, and may be considered as armature means. The instantaneous position of the armature means is sensed and signaled by position sensors 11. The position sensors may be lateral effect cells, quad cells or other position sensors exhibiting proper qualities of precision, cost and mass, and may be considered as position sensing means.

The spring colonnade basket, which serves as armature support means, is balanced so as to provide a friction-free suspension to the armature in operative juxtaposition to the stator. The flexure columns (4, 5, 6 shown) may be of piano wire material or other material capable of flexing in X-Y-Theta dimensions while maintaining longitudinal stability.

Figure 2:
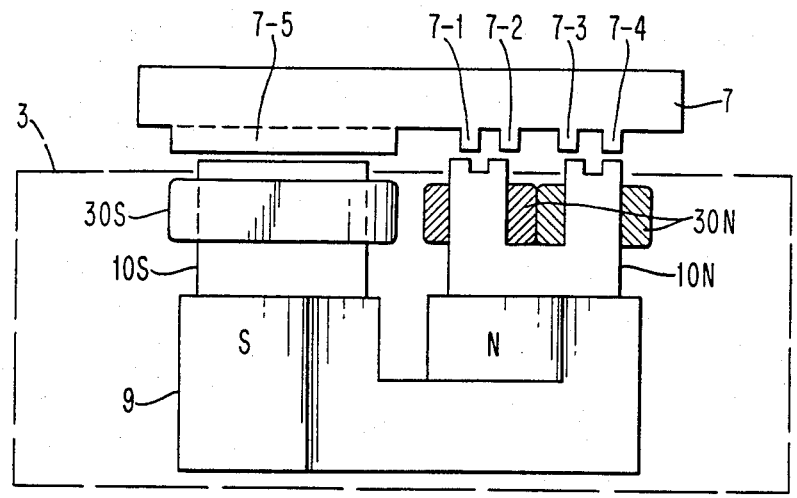
FIGS. 2 and 3 show the orthogonal positioning of the magnet pole pieces which provide motive power to the positioning motor of the precision X-Y-Theta positioner of FIG. 1.
Figure 3:
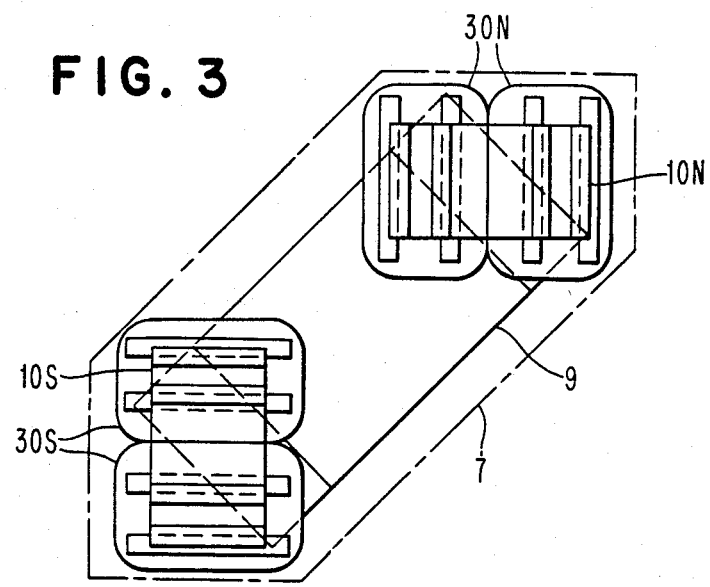

FIGS. 2 and 3 illustrate one of the two positioner motors. The motors are positioned so as to share a common stator and a common armature. Each motor is made up of armature 7 and stator 3. Permanent magnet 9, with its pole pieces 10S and 10N, operates with armature 7 to provide motive force in both the X and Y dimensions at the same time. Theta torque is derived from imbalances in X drives, or from imbalances in Y drives, from the two motors.

Stator 3, made up of two permanent magnets 9 with their pole pieces 10S and 10N and associated windings 30S and 30N, provides flux differentials at teeth (7-1, 7-2, 7-3, 7-4 and 7-5 shown) of armature 7, providing motive power in both the X and Y dimensions at the same time. Pole pieces 10S and 10N are set orthogonal to each other, and at 45 degree angles to the axis of their permanent magnet 9. Armature 7 is positioned appropriately for the positioning of pole pieces 10S and 10N so that vector X-Y motions may be impressed on armature 7 with respect to the fixed platform base and magnet 9.

FIGS. 4–7 diagram various types of motions within the repertoire of the precision X-Y-Theta positioner. There are at least two electromagnets so as to provide magnetomotive forces balanced or imbalanced selectively for pure translational (X-Y) motions, for rotational (Theta) motions, or for composite vector translational-rotational (X-Y-Theta) motions.

Figure 4:
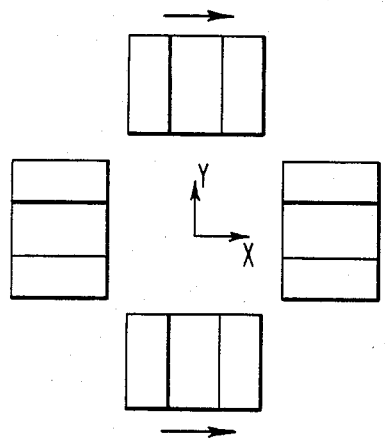
FIGS. 4, 5, 6 and 7 are motion diagrams respectively for X-translation, Y-translation, Theta-rotation, and for a representative X-Y-Theta composite translation-rotation.
Figure 5:
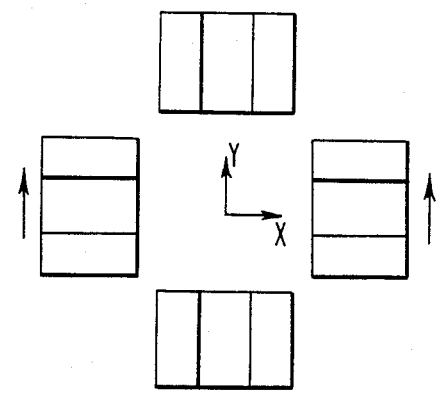
Figure 6:
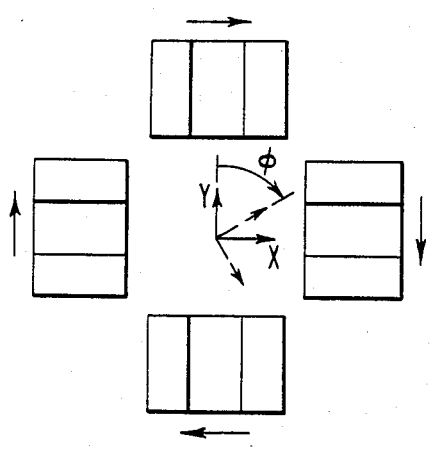
Figure 7:
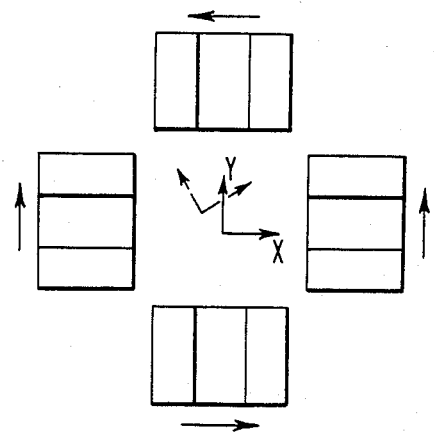

FIG. 4 shows a representative pure translation (plus x) motion. FIG. 5 shows a representative pure translation (plus y) motion. FIG. 6 shows a representative pure rotation (plus Theta) motion. FIG. 7 shows a representative composite vector translation-rotation (minus x, plus y, minus Theta) motion.

Figure 8:
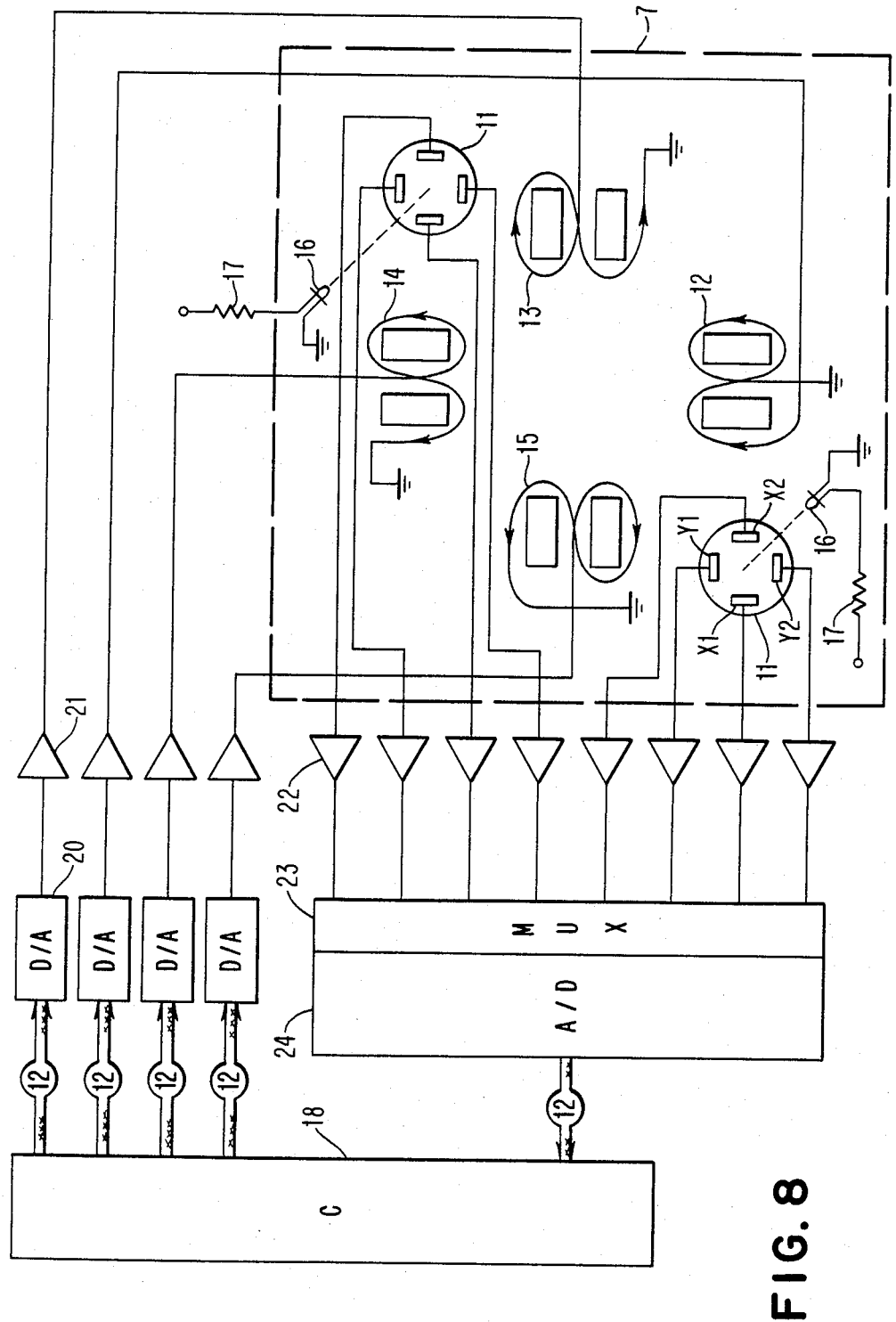
FIG. 8 is a diagrammatic presentation of the electronics and power electric circuits of the precision X-Y-Theta positioner.

FIG. 8 diagrams the electronic relationships of the armature, the magnet pole pieces, the computer and the position sensor. Position sensors 11 serve as the position sensors for the armature, providing unbalanced voltage signals related to the instantaneous position of the armature with respect to related reference beacon lamps mounted on the stator at corresponding reference points. The computer accepts these position signals, calculates position error statements required to move from instantaneous position to desired position, and sends motion control currents back to motor magnet coils 12, 13, 14 and 15 (which are wound on pole pieces 10) as required to cause movement of armature 7 to the desired position and orientation. Reference point beacon lamps 16, provided with current via circuitry 17, provide positioning information with respect to the reference points of position sensors 11. The position sensors 11 in the preferred embodiment are a pair of lateral effect cells, located in the stator along diameter d at distances d/2 from the center of the stator, directly opposite their related beacon lamps. As the light which may be infra-red) moves between the electrodes of the cells, the cells provide unbalanced location voltage signals to the computer 18, via circuitry including representative amplifier 22, multiplexer 23 and analog-to-digital converter 24. Computer 18, which has been provided with the coordinates of the desired new location, calculates the position and angle error, and provides a position and angle error statement to motor control means made up of digital-to-analog converters, including representative D/A converter 20 and circuitry including representative amplifier 21, which provides motion control currents. This completes the servo loop. Motion of the armature is accordingly provided, and a new instantaneous position and orientation is signaled by position sensors 11. This new instantaneous position and orientation signal is carried back to the computer for dynamic updating of the position and angle error statement. Relatively simple programming changes to computer 18 can be made to provide not only desired motions to armature 7, but also to control the compliance (flexure column resistance to repositioning of the armature 7). The flexure columns provide a nominal compliance; by programming in a ratio change to the digital values provided to the analog-to-digital converter, the nominal compliance may be altered from minimum resistance to repositioning to maximum resistance to repositioning. Compliance may also be programmed to vary as a function of position (for example, higher near the limit of travel) or as a complex variable or logarithmic function.

DESCRIPTION OF HOW THE MOTOR WORKS

The motor differs from the well known linear positioners, such as that of Sawyer, in that a single magnet, with one pole piece normal to the other, provides both X-motion and Y-motion. Theta motion is derived from imbalances between X motions and Y-motions from different motors; these imbalances provide Theta torque for rotational motions. Controlled imbalances result in composite X-Y-Theta motion vectors.

Referring to FIG. 3, a permanent magnet 9 (which can be Alnico or rare-earth or other magnetic material) provides a bias field. Magnetic flux passes through magnetically soft pole pieces 10S and 10N, dividing equally through the two legs of each pole piece. Several teeth provided in the pole pieces and armature serve to increase the available force. In the absence of current in the coils 30N and 30S, the armature assumes a neutral position, supported by the flexure columns. Coils 30N are wound with opposite sense on the two legs of the pole piece 10N; similarly for 30S and 10S. Current flowing through the coils 30N induces a magnetic flux which adds to and subtracts from the permanent magnet flux in the two legs of pole piece 10N, causing the armature to be attracted to the right or left, depending on the sign of the current. The armature is free to move by slightly deforming the flexure columns; the small restoring force related to energy stored during previous flexing of the flexure columns is predictable and can generally be compensated for or ignored. Thus a motion is generated whose value is proportional to the algebraic value of current flowing in the coils. The same relationship holds for pole piece 10S and coils 30S, except the armature motion is in and out of the plane of the paper in the view shown. The teeth on the north and south pole pieces are arranged orthogonal to each other, so motions due to coils 30S and 30N are independent. The provision of plural motors allows for generation of torques to produce rotational (Theta) motions about an axis mutually perpendicular to the X and Y axes.

LATERAL EFFECT CELLS

Lateral effect cells (position sensing photodiodes) are well-known in the art, and are commercially available. The lateral effect cell is essentially a planar photodiode which reacts to a beacon light to provide electrical signals as a function of the location of the spot of light from the beacon. In the preferred embodiment, the beacon lights are lamps 16 mounted on the stator. The lateral effect cell has a square active surface; the position of the small spot of light on the surface of each lateral effect cell is determined by measuring the generated photocurrents in four electrodes arranged on the periphery of the square active surface of the lateral effect cell. If we denote the two primary measuring directions as X and Y, then electrodes X1 and X2, whose principal axes are perpendicular to the X measuring direction, are used to measure the X position of the light spot; similarly for Y. The X position is given by dividing the difference in the X1 and X2 currents by their sum. The Y position is given by dividing the difference in the Y1 and Y2 currents by their sum. These calculations are performed by analog circuits, digital circuits, by software, or by a combination of these methods, as is well known in the art.

In the preferred embodiment, two lateral-effect cells are used as position sensors to determine position and orientation of the armature. Each of the two lateral effect cells is located at some radial distance d/2 on a diameter at opposite sides of the stator.

Let x,y denote the local coordinate system on one cell, and x',y' denote the local coordinate system of the second cell a distance d away. The x,y and x',y' frames are unrotated with respect to each other; i.e., x is parallel to x' and similarly y is parallel to y'.

Let X,Y denote a coordinate system unrotated with respect to x,y and x',y' and lying midway (d/2) between the two cells. Required is the position and orientation of an imaginary mark in the center of the armature (home position coincident with X=0, Y=0, Theta=0).

From geometrical considerations, $$X = (x + x')/2,$$

$$Y = (y + y')/2,$$

$$\text{Theta} = 2 \text{ Arcsin} \left[ \frac{\sqrt{(x - x')^2 + (y - y')^2}}{2d} \right].$$

FOUR MODES OF OPERATION OF THE PRECISION X-Y-THETA POSITIONER

AS A FINE POSITIONING DEVICE

The fine positioning device may be used to execute fine X-Y-Theta motions, which motions are sub-micron in X and Y precision and sub-degree in Theta precision, from a total range of the order of 2 millimeters and several degrees. Motion is rapid and controlled by the feedback loop involving the built-in lateral effect cell position sensors, but could be provided by separate, external sensors which sense the work environment directly. The ability to execute fine motions has many applications in science and engineering.

AS A VARIABLE COMPLIANCE DEVICE

The precision X-Y-Theta positioner, when operating in a "regulator mode", attempts to maintain its commanded position. Any external forces tending to displace the device will be met by restoring forces generated by the servo controller. By varying the closed loop gain parameter (in the preferred embodiment this is done simply by changing coefficients in the computer control program) the compliance or stiffness of the device is varied. The natural compliance of the device in open-loop mode is determined by the spring constants of the flexure columns. In closed-loop mode, the compliance is programmed, and may range from much greater than to much less than the natural compliance, as well as equal to the natural compliance simulating open-loop mode. This property is extremely useful for tasks involving the fitting together of two or more mating parts, as in a robot assembly operation.

AS A VARIABLE FORCING DEVICE

In some applications, it is desirable to exert known forces on a workpiece, as in pull-testing of electrical connector pins. In many cases, negligible motion occurs during the action of the force. The precision X-Y-Theta positioner is capable of exerting programmed translational forces and torques, since the force exerted on the armature by the pole pieces is proportional to the current flowing through the coils, and the forces on the flexure columns of the colonnade are linearly related to displacement from equilibrium.

AS A MEASURING DEVICE

By virtue of its built-in position sensors, the precision X-Y-Theta positioner can be used as a passive measuring device, in a mode where the coil drive currents are disabled. Applications such as parts profiling can be accomplished by sensing the relationship between a mechanical probe or stylus attached to the movable armature and the fixed part of the device. In this mode, attached to an external coarse positioner, the size and shape of parts can be determined.

COMBINATION MODES AND APPLICATIONS

Since the precision X-Y-Theta positioner incorporates digital control, operation can be switched between the various modes described above as may be necessary to perform a given task. Typical tasks for the precision X-Y-Theta positioner are semiconductor mask alignment, chip probing and chip placement; tape and disk head assembly; interpolators for stepping motors; scanning microscopy; and laboratory investigations.

Figure 9:
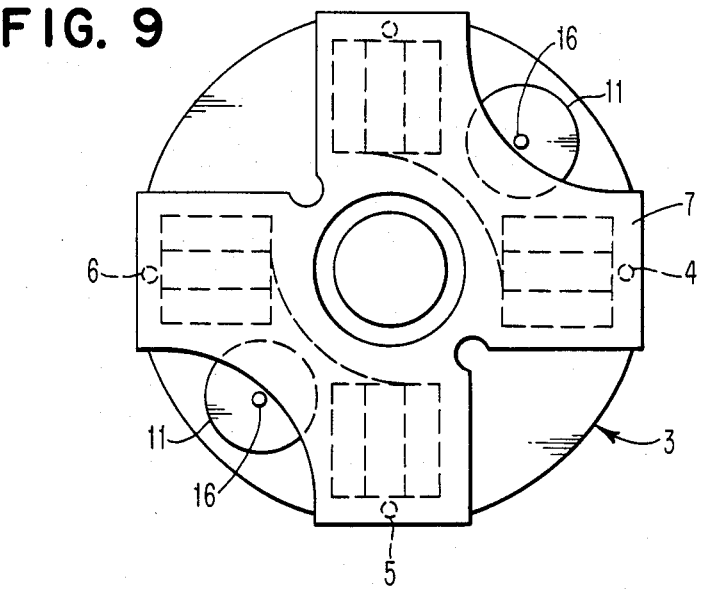
FIG. 9 is a simplified top view of the precision X-Y-Theta positioner.
Figure 10:
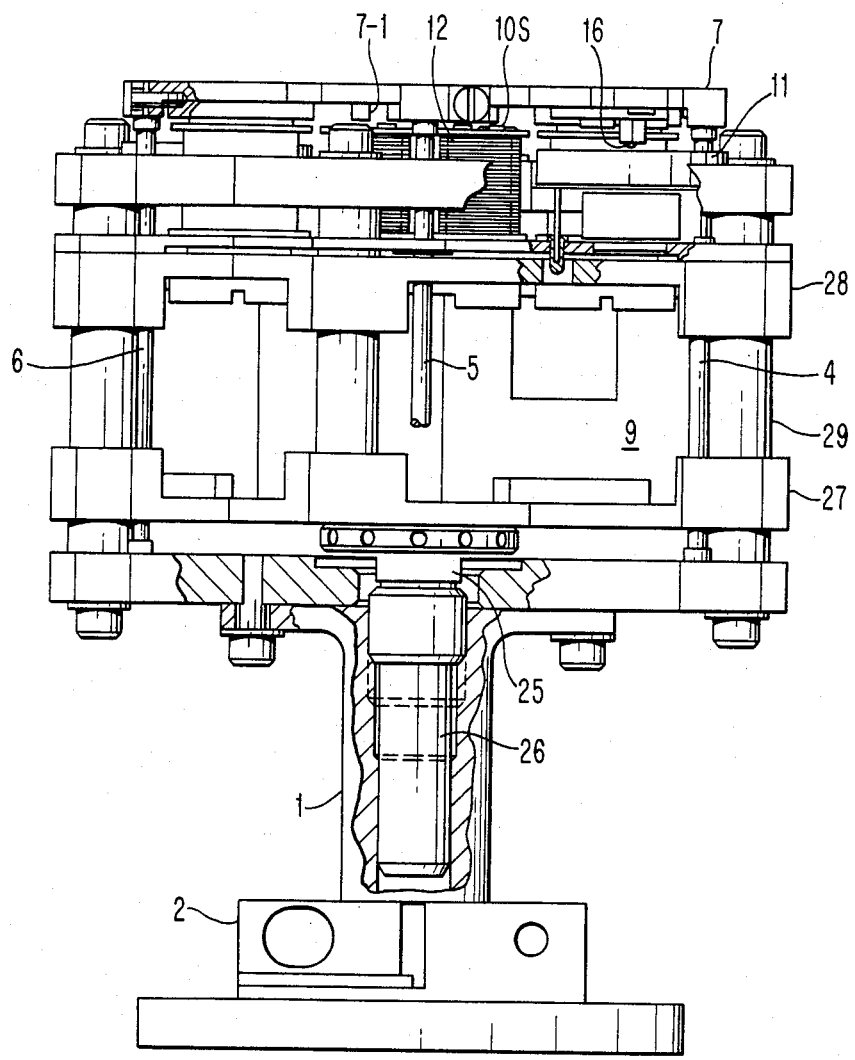
FIG. 10 is a detailed partially cutaway side view of the precision X-Y-Theta positioner.

FIGS. 9 and 10 illustrate details of the preferred embodiment of the precision X-Y-Theta positioner. FIG. 10 shows a colonnade of flexure columns (including 4, 5 and 6), which support armature 7. The armature is configured for light weight and to present itself to the motor magnets. Armature 7 carries reference point beacon lamps 16. Support post 1 and bracket 2 form a substantial base upon which the X-Y-Theta positioner is assembled. Stator 3 is made up of electromagnets and suitable supporting structure. Flexure columns 4 support armature 7 in operable juxtaposition with stator 3. Stator 3 includes electromagnets 9, with associated coils (12 shown) wound about pole pieces 10. Position sensors 11 operate with associated beacon lamps 16. Flexure columns (4, 5 and 6 shown) support armature 7 and provide for armature motion in its own plane by flexing in X-Y-Theta directions.

Motor magnet pole pieces (10S shown) provide magnetic flux to teeth (7-1 shown) on armature 7 to provide power for positioning. Lateral effect cells 11 operate with beacon lamps 16 at reference points on the stator and armature and provide position signals from which position error statements are derived by the computer.

Adjustment may be required to provide appropriate clearance between armature and stator. Adjustment mechanism 25, made up of a leadscrew and capstan nut, provides for manual adjustment, by capstan bar in the capstan nut, so as to locate the stator with proper clearance to the armature. Adjustment mechanism 25 operates by raising or lowering stator support platforms 27 and 28, which are in fixed relationship to one another in their function of supporting the electromagnets of the stator, and which slide on support rods 29. Support rods 29 do not flex as do flexure columns such as 4, 5, and 6.

These and other alternatives will be apparent to those skilled in the positioner art, without departing from the spirit and scope of the invention as pointed out in the following claims.

We claim:
1. A precision X-Y-Theta positioner characterized by
  (a) stator means establishing a reference plane having a beacon reference point;
  (b) armature means establishing an armature plane having a reference point, said armature means and said stator means together forming motor means;
  (c) armature support means, forming with said armature a spring colonnade basket support of flexure columns establishing said armature in space with freedom of motion in X, Y and Theta directions about the reference point in the armature plane;
  (d) armature position and angle sensing means, mounted on said armature and said stator means, for sensing the position and angle of said armature;
  (e) control computer means;
  (f) feedback means connecting said armature position and angle sensing means to said control computer means;
  (g) motor control servo means connecting said control computer means and said motor means operatively so as to provide motive power to said armature in response to programmed desired position and angle data and position and angle sensing signals from said position and angle sensing means via said feedback means.

2. A precision X-Y-Theta positioner characterized by
(a) stator means defining a reference plane having an included reference point;
(b) stator carrier platform means, positioned movably with respect to said stator means, in a stator carrier plane essentially parallel to said reference plane;
(c) columnar spring means mounted perpendicular to said stator means (a) on said stator carrier platform means (b);
(d) armature means, supported by said columnar spring means (c) in a plane substantially parallel to the reference plane, operatively juxtaposed to said stator means (a);
(e) position and angle sensing means, mounted on said armature means (d) and said stator means (a) so as to indicate instantaneous position and angle of said armature means (d);
(f) control computer means for providing operational control signals to said armature means (d) and to said stator means (a);
(g) position feedback means interconnecting said position sensing means (e) and said control computer means (f);

whereby said armature is selectively controllable for operations at its instantaneous position and orientation, including movement to a desired new position and angle, under control of said control computer means (f) in accordance with a program for characterizing such operations.

3. A precision X-Y-Theta positioner according to claim 2 further characterized in that
said stator means includes a plurality of permanent magnets, and for each permanent magnet, includes first and second pole pieces in mutually orthogonal planes, perpendicular to said reference plane, at acute angles totalling 90 degrees.

4. A precision X-Y-Theta positioner characterized by
(a) stator means defining a reference plane;
(b) armature means defining an armature plane, said armature means and said stator means together forming motor means;
(c) a spring colonnade basket support of flexure columns mounting said armature means in operable juxtaposition to said stator means with multiple degrees of freedom within the constraint that the armature plane remains substantially parallel to said reference plane;
(d) first and second position and angle sensing means, mounted on said stator means and said armature means, for sensing position and angle of said armature and for supplying armature position and angle signals; and
(e) control computer means, responsive to the armature position and angle signals from said position and angle sensing means, for supplying position and angle error statements; and
(f) control servo means, responsive to position and angle error statements from said control computer means, for supplying position and angle control currents to said motor means.

5. A precision X-Y-Theta positioner characterized by
(a) stator means defining a reference plane;
(b) armature means defining an armature plane, said armature means and said stator means together forming motor means;
(c) a spring colonnade basket support of flexure columns mounting said armature means in operable juxtaposition to said stator means with multiple degrees of freedom within the constraint that the armature plane remains substantially parallel to said reference plane;
(d) first and second position and angle sensing means, mounted on said stator means and said armature means, for sensing position and angle of said armature and for supplying armature position and angle signals;
(e) control computer means, comprising means for generating digital position error signals, responsive to the armature position and angle signals from said position and angle sensing means, for supplying position and angle error statements; and
(f) control servo means, responsive to position and angle error statements from said control computer means, for supplying position and angle control currents to said motor means and further comprising digital-to-analog conversion means, responsive to the digital position error statements from said control computer means, for providing the actual control currents for said motor means; and
(g) variable compliance means, for controlling the compliance of said armature by varying the values of said digital position and angle control signals as a function of a compliance function variable.

* * * * *